United States Patent
Motiwala et al.

(10) Patent No.: US 7,590,164 B2
(45) Date of Patent: Sep. 15, 2009

(54) METHOD AND APPARATUS FOR EFFICIENT USE OF COMMUNICATION RESOURCES IN A COMMUNICATION SYSTEM

(75) Inventors: Quaeed Motiwala, San Diego, CA (US); Christopher C. Riddle, San Diego, CA (US); Luca Blessent, San Diego, CA (US); Shih-Yi Yeh, Santee, CA (US); Robert J. Fuchs, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1348 days.

(21) Appl. No.: 09/766,558

(22) Filed: Jan. 19, 2001

(65) Prior Publication Data

US 2002/0106005 A1    Aug. 8, 2002

(51) Int. Cl.
*H04B 1/00* (2006.01)

(52) U.S. Cl. ............... 375/142; 375/143; 375/150; 375/152; 375/326

(58) Field of Classification Search ........ 375/130, 375/135, 136, 140, 142, 146, 147, 148, 224, 375/228, 340, 341, 326, 143, 150, 152; 370/335, 370/330, 342, 345
See application file for complete search history.

(56) References Cited

U.S. PATENT DOCUMENTS

| | | | | |
|---|---|---|---|---|
| 5,818,882 A | * | 10/1998 | Komatsu | 375/344 |
| 5,859,843 A | * | 1/1999 | Honkasalo et al. | 370/342 |
| 6,038,253 A | * | 3/2000 | Shimazaki | 375/224 |
| 6,064,662 A | | 5/2000 | Gitlin et al. | 370/330 |
| 6,381,234 B2 | * | 4/2002 | Sakoda et al. | 370/336 |
| 6,535,502 B1 | * | 3/2003 | Brink | 370/345 |
| 6,625,236 B1 | * | 9/2003 | Dent et al. | 375/341 |
| 6,754,290 B1 | * | 6/2004 | Halter | 375/340 |

FOREIGN PATENT DOCUMENTS

| | | |
|---|---|---|
| EP | 0841763 | 5/1998 |
| EP | 0998052 A2 * | 5/2000 |
| EP | 1059740 | 12/2000 |
| JP | 08-163085 | 6/1996 |
| JP | 10-200445 | 10/1998 |
| WO | WO 00031889 | 6/2000 |

OTHER PUBLICATIONS

International Search Report, PCT/02/01795, International Search Authority - European Patent Office, Aug. 16, 2002.

* cited by examiner

*Primary Examiner*—Ted Wang
(74) *Attorney, Agent, or Firm*—Kenneth Vu

(57) ABSTRACT

The frame of data is partitioned into a plurality of portions of data symbols. A plurality of channel elements is assigned to demodulate data symbols of correspondingly the plurality of portions of data symbols. The number of the plurality of portions of data symbols is higher in a case at high data rate than a case at low data rate.

14 Claims, 3 Drawing Sheets

METHOD AND APPARATUS FOR EFFICIENT USE OF COMMUNICATION RESOURCES IN A COMMUNICATION SYSTEM

BACKGROUND

I. Field of the Invention

The disclosed embodiments relate to the field of communications, and more particularly, to communications in accordance with the code division multiple access (CDMA) technique.

II. Background

A system for wireless communications in accordance with the CDMA technique has been disclosed and described in various standards published by the Telecommunication Industry Association (TIA). Such standards are commonly known as TIA/EIA/IS-2000 and TIA/EIA/95A\B, among several others, and titled as Mobile Station-Base Station Compatibility Standard for Wideband Spread Spectrum Cellular Systems, incorporated by reference herein. The standards have been evolving over the past several years. The early version of the CDMA system allows communications between base stations and mobile stations in a fixed length time frame and at multiple data rates. The more recent version of the standard, commonly known as the IS-2000 standard, allows communications via different size time frames and at higher data rates than the earlier version.

To maintain communications between a mobile station and a base station, a forward link, from the base station to the mobile station, and a reverse link, from the mobile station to the base station, may be established. At a receiving end of the reverse link communications, the receiver may receive data frames at different data rates. The receiver may have limited resources for processing the received data frames. A communication resource, known as a channel element, allocated for processing a data frame may include one or more fingers for correlating with different multi-path signals. The channel element demodulates the data symbols in each received data frame. Each assigned finger provides symbol energy in accordance with a timing hypothesis. The received energies of each symbol are summed to output a data symbol. The number of data symbols in a frame of data depends on the data rate of the frame. A frame of data contains more data symbols at high data rates than at low data rates. As such, processing a frame of data takes more resources at high data rates than at low data rates.

At a base station, the data frames received from different mobile stations may be at different data rates. In a system operating in accordance with the IS-2000 standard, a receiver in a base station with limited resources may have to process data symbols at a wide range of data rates for a number of mobile stations in reverse link communications with the base station. Therefore, in accordance with the IS-2000 standard, when data frames at high data rates are received, a limited number of communication resources may be allowed for processing data frames at low data rates.

It is to this end as well as others, that in a receiver with a limited number of resources, there is a need for a method and apparatus for efficient use of the resources.

SUMMARY

Generally stated, in a communication system, a method and apparatus is provided for efficient use of the communication resources for processing a plurality of frames of data. Each of the plurality of frames of data is partitioned into a plurality of portions of data symbols. A plurality of channel elements is assigned to each of the plurality of frames of data. Each assigned channel element demodulates data symbols of a portion of data symbols of the plurality of portions of data symbols. In one embodiment, the number of the plurality of channel elements assigned to each frame of data is based on a data rate of the data symbols in each of the plurality of frames of data. In one embodiment, data frames with higher data rates are assigned a higher number of channel elements than the data frames with lower data rates. Moreover, in one embodiment, the number of the plurality of portions of data symbols in each of the plurality of frames of data may be based on a data rate of the data symbols in each of the plurality of frames of data. Similarly, data frames with a higher data rate may be partitioned into a higher number of portions than the data frames with a lower data rate.

DESCRIPTION OF THE PREFERRED EMBODIMENT(S)

Figure 1:
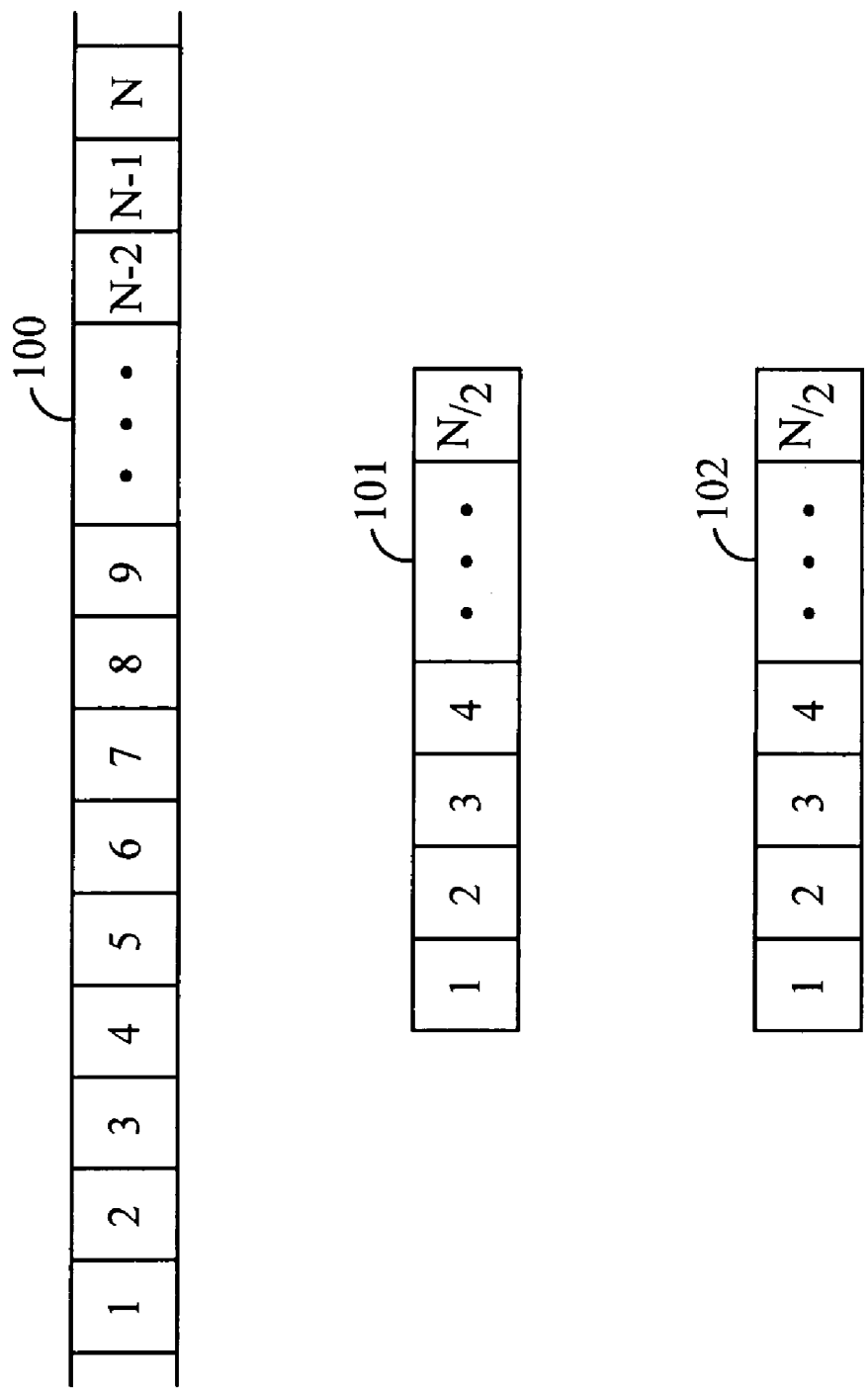
FIG. 1 depicts a frame of data that may include any number of data symbols, identified as "n" number of data symbols.

Generally stated, a novel and improved method and an accompanying apparatus provide for an efficient use of communication resources in a code division multiple access communication system. The exemplary embodiment described herein is set forth in the context of a digital communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

In one embodiment, in a communication system, a method and apparatus is provided for efficient use of the communication resources for processing a frame of data. The method and the accompanying apparatus include partitioning the frame of data into at least first and second portion of data symbols. Each frame of data may include a fixed number of data symbols. Each portion may include a number of data symbols of the fixed number of data symbols. When the frame of data is partitioned into the first and second portions, the first portion includes a number of the fixed number of data symbols, and the second portion includes the remaining number of data symbols. As such, the first and second portions encompass all the data symbols in the frame of data. A first channel element is assigned to demodulate data symbols of the first portion of data symbols, and a second channel element is assigned to demodulate data symbols of the second portion of data symbols. The first and second portions of data symbols are demodulated by, correspondingly, the first and second channel elements.

The data frame may be received via a commonly known radio frequency receiver front end. A received radio frequency signal carries the data frame. The radio frequency front end converts the received radio frequency signal to base band frequency or a suitable frequency for processing. The base band frequency signal may be used in a correlation process in accordance with timing of at least one assigned finger for at least one data symbol in the frame of data. A result of the correlation, such as, e.g., a symbol energy value, is used in the first and second channel elements for the demodulation process. In a particular embodiment, after the demodulation, demodulated data symbols from the first and second channel elements are written to, and subsequently read from, a RAM in accordance with a de-interleaving function in the communication system. Accordingly, partitioning a frame of data into at least first and second portions of data symbols allows the channel elements assigned to the first and second portions to demodulate the data symbols in the data frame more efficiently.

Referring to FIG. 1, a frame of data 100 is shown. The frame of data 100 may include any number of data symbols, identified as "n" number of data symbols. The number of data symbols in frame 100 may range from 576 to 12288 data symbols in various increments in an embodiment in accordance with the IS-2000 standard. The data rate of the frames with 576 data symbols is much lower than the data frames with 12288 data symbols, considering the time frames have a common and fixed duration. Frame 100, accordingly, may be partitioned into a first portion 101 and a second portion 102. The number of data symbols in the first and second portions 101 and 102 may be equal. The data symbols in each portion 101, 102 may correspond to consecutive data symbols in frame 100. For example, the data symbols in the first portion 101 may include the first half of the data symbols in frame 100. The second portion 102 may include the second half of the data symbols in frame 100. Alternatively, the data symbols in the first portion 101 may be the odd numbered data symbols in frame 100, and the even numbered data symbols may be included in the second portion 102.

The partitioning may take place by tagging each data symbol as to whether it belongs to the first portion 101 or the second portion 102. The tagging may be accomplished by keeping track of each data symbol from the beginning of frame 100 via a time clocking scheme. Each data symbol may be represented as a number of chips. For example, eight chips may represent one data symbol at a predefined data rate. Therefore, when a receiver is clocking the chips in each frame, the receiver keeps track of each data symbol depending on the number of chips counted from the beginning of frame 100.

Figure 2:
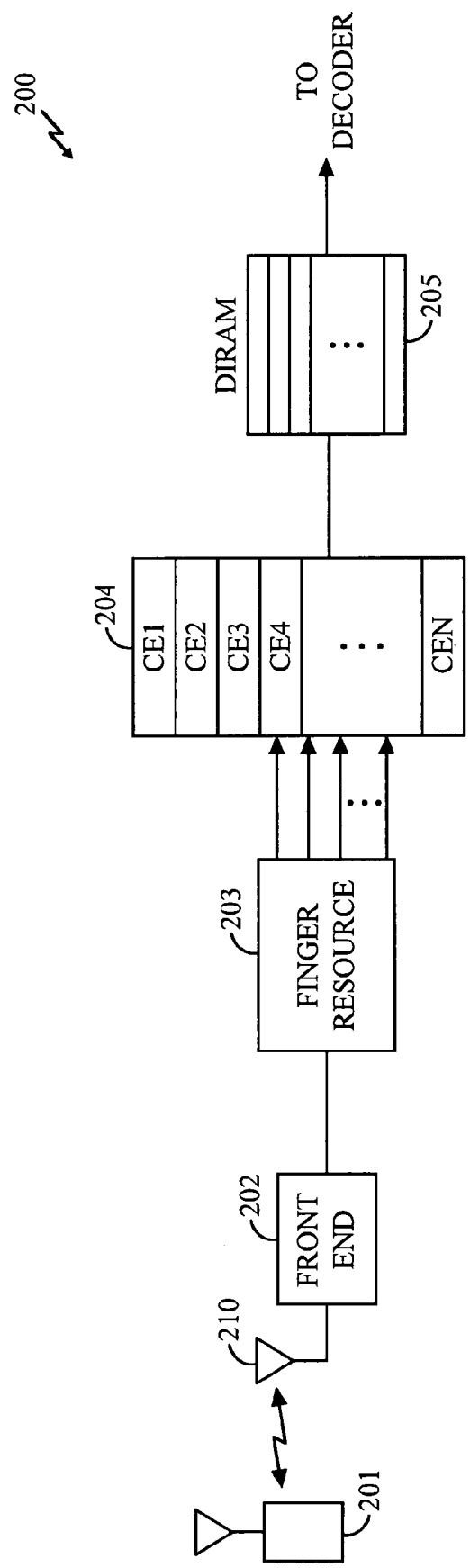
FIG. 2 depicts a block diagram of a receiver for receiving and processing signals.

Referring to FIG. 2, a block diagram of a receiver 200, configured in accordance with an embodiment, is shown. Receiver 200 may be used in a base station (not shown) for receiving reverse link signals from different mobile stations. Receiver 200 may receive signals from multiple mobile stations at the same time, although, only one mobile station 201 is shown. The received signal passes through an antenna 210 and frond end 202 assembly. Front end 202 may be any commonly known front end receiver for converting the received signal at radio frequency to base band frequency or any other suitable frequency for processing. The converted received signal passes to a finger resource block 203. Finger resource block 203 correlates with the received signal in accordance with at least one timing hypothesis. If the correlation process provides adequate signal energy, the result is passed to a combiner element (CE) 204. Normally several different timing hypotheses are attempted in the correlation process. The selected fingers that produce symbol energy above a threshold are used in the process. If more than one finger is assigned to the received signal, the results of all assigned fingers are summed in CE 204.

Combine element 204 may include a memory unit (not shown) where results of the combining process are stored. The results of the data symbols of the first portion 101 of data symbols are stored in, for example, location CE1 of CE 204. The results of the data symbols of the second portion of the data symbols are stored in, for example, CE2 of CE 204. A combination of clocking and tagging schemes, not shown for simplicity, keeps track of the location of each symbol of the data frame. Each symbol produced by finger resource 203 is routed to its corresponding combiner element location depending on whether the data symbol belongs to the first portion 101 or the second portion 102.

After all the data symbols associated with a frame of data are stored in their corresponding combiner elements, the data symbols are written into a de-interleaver RAM (DIRAM) 205. The data symbols are read from DIRAM 205 and provided to a decoder (not shown) for a decoding operation. The operations of read and write in DIRAM 205 may be in accordance with a de-interleaving function as defined by the standard, for example the IS-2000 standard.

Figure 3:
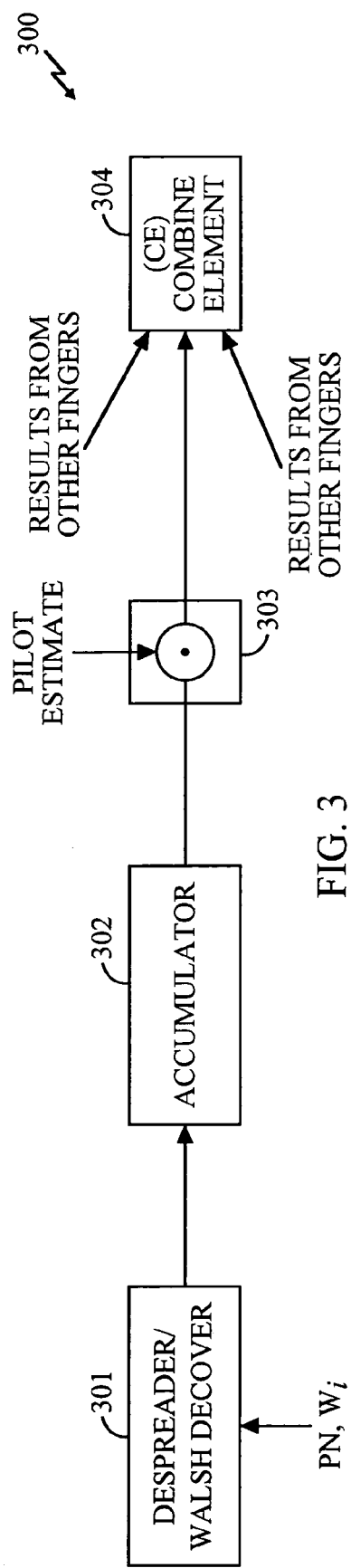
FIG. 3 depicts a block diagram of a channel element.

Referring to FIG. 3, the combined operations of finger resource 203 and combiner element 204 may be represented by a channel element 300 in accordance with an embodiment. In accordance with the CDMA communication technique, each receiver signal is spread in accordance with a PN code at the transmitting source. Moreover, each channel in the received signal is also assigned a Walsh code which is used to Walsh cover the information in the channel at the transmitting source. Therefore, the received signal passes through a PN despread operation and a Walsh decover operation in block 301. The PN despread operation may take place first. The result of the despread operation passes through the Walsh decover operation. The results from block 301 are normally produced at chip level. Several chips are accumulated in an accumulator 302 to form one data symbol. The accumulated chips pass to a multiplier block 303.

Each transmitting source (not shown) also transmits a pilot channel. The operation and use of a pilot channel are well known by one of ordinary skill in the art. The receiver 200 also processes the pilot channel to produce estimates of the pilot channel. The pilot channel processing element is not shown for simplicity. The multiplier block 303 multiplies the accumulated chips with the pilot channel estimate through an operation commonly known as the dot product operation. The result passes to a combiner element 304.

Block 301 may use several different timings of the PN sequence used in the despread operation. Each timing may produce a different correlation energy. If the correlation energy is above a threshold, the result is then used. Otherwise, a different timing may be attempted. Often, multiple timings produce a signal energy above the threshold. Once a timing is selected, a finger with the corresponding timing is assigned to despread the received signal. As such, several fingers may be assigned. The result from each finger passes through an accumulation process, similar to the accumulation process in block 302, and pilot estimate correction as defined by a corresponding pilot estimate, similar to the operation in block 303. The data symbols that result from each finger then pass to combiner element 304 for the combining operation described with reference to FIG. 2.

The processing time of the fingers may be such that blocks 301, 302 and 303 are used to do all of the processing in real time for all of the selected timings. For example, in the despreading process in block 301, a despread operation for a data symbol may take less time than the difference between the timings of two fingers. As such, the processing by one finger in accordance with its timing may finish before the due time for processing the same data symbol in accordance with timing of another finger. As such, blocks 301, 302 and 303 may be reused through a time division multiplexing of the available hardware.

Figure 4:
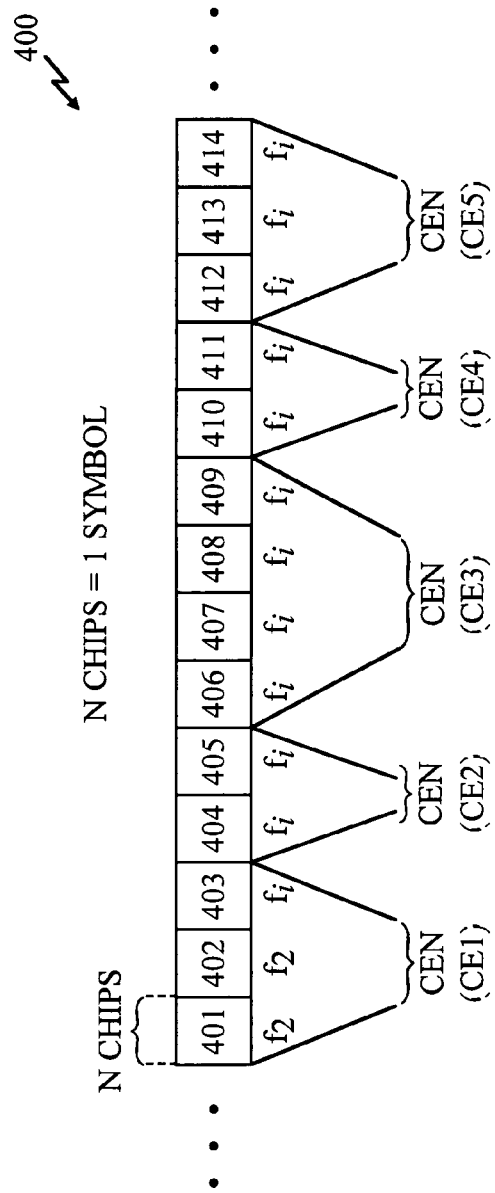
FIG. 4 depicts a timing diagram of chips produced for a number of data symbols.

Combine element 304 may be one of the combiner elements (CE1-CEn) of CE 204 as shown in FIG. 2. The data symbols as identified to belong to a portion of data symbols are stored in a corresponding combiner element. Referring to FIG. 4, a timing diagram 400 is shown that may assist in description of various embodiments. Each finger, identified as "fi", processes a number of chips to produce each data symbol at the input of CE 204. For example, eight chips may be equal to one data symbol. If three fingers are assigned to the channel that carries the data symbol, three sets 401-403 of chips are produced. Each set represents one data symbol. The sets 401-403 are passed to a common combiner element, identified by "CEn", where "n" can be any identifier. Similarly, sets 404 and 405 are passed to a common combiner element. If the data symbol as represented by the chips in the sets 401-403 and the data symbol as represented by the sets 404-405 belong to the same portion of data symbols in the frame of data, all the sets 401-405 are passed on to the same combiner element. Otherwise, the combiner elements would be different. For example, CEn for sets 401-403 may be CE1, and for sets 404-405 may be CE2. Each data symbol, through its associated chips, is identified to belong to one of the portions of the data symbols. The sets 406-414 pass to corresponding combiner elements based on the identity of the data symbol that they are representing. Therefore, among other reasons, the resources in the receiver 200 are used efficiently by passing data symbols of each portion of data symbols to a common combiner element.

In a communication system, a method and apparatus is provided in accordance with various embodiments for efficient use of the communication resources for processing a frame of data. The frame of data is partitioned into a plurality of portions of data symbols. A plurality of channel elements is assigned to demodulate data symbols of correspondingly the plurality of portions of data symbols. The number of the plurality of portions of data symbols is higher in a case of high data rate than a case of low data rate.

The number of data symbols in a frame of data is higher at the high data rates than the low data rates. For example, in accordance with the IS-2000 standard, the number of data symbols in a frame of data may range from 576 data symbols to 12288 data symbols. The data rate for a frame of data with 576 data symbols may be equal to 28800 symbols per second, and for a frame of data with 12288 data symbols may be equal to 614400 symbols per second. The data frame at 614400 symbols per second may be partitioned into eight portions of data symbols. As a result, eight channel elements are assigned to demodulate data symbols of correspondingly the eight portions of data symbols. For a frame of data at a lower data rate, for example at 153600 symbols per second, with, perhaps, 3072 data symbols, the data frame may be partitioned into two portions of data symbols, and two channel elements may be correspondingly assigned to the two portions to demodulate the data symbols correspondingly in each portion. For a frame of data at a mid-level data rate, for example, 307200 symbols per second, with, perhaps, 6144 data symbols, the data frame may be partitioned into four portions of data symbols, and four channel elements may be correspondingly assigned to the four portions to demodulate the data symbols correspondingly in each portion. The plurality of assigned channel elements may correspondingly demodulate the data symbols in the plurality of portions of data symbols.

The communications between the receiver and the transmitting source in a communication system may be via several communication channels. On a related communication channel, the receiver may receive information related to a data rate of data symbols of the frame of data. The data rate information may be used to determine the number of the plurality of portions of data symbols based on the data rate of the frame of data. Alternatively, the receiver may determine the data rate of each frame of data, for example, by estimating the data rate of the frame of data. If the estimate of the data rate proves to be inaccurate, a new estimate may be used. The process for estimating the data rate may be repeated. Moreover, the receiver may request to receive data frames at a specific data rate. The transmitting source while complying with the request transmits data frames at the requested data rate. As such, the receiver knows ahead of time about the data rate of the frame of data being received. The data rate request information may be used to decide the number of the plurality of portions of data symbols.

The frame of data may be received via a commonly known radio frequency receiver front end. At least one data symbol in the frame of data may pass through a correlation process in accordance with timing of at least one assigned finger as shown and described in FIG. 3. A result of the correlation is passed to CE 304 for the combining process. Data symbols in each portion of data symbols are routed to a common combiner element. Combine element 304 may be one of the combiner elements (CE1-CEn) of CE 204 as shown in FIG. 2. The data symbols identified to belong to a portion of data symbols are stored in a corresponding combiner element. For example, in the case where each frame of data is partitioned into four portions, CE1, CE2, CE3 and CE4 are used for correspondingly the four portions.

A number of chips for each data symbol at the input of CE 204 may be equal to one data symbol. For example, for the basic data rate of 28800 symbols per second, a set of sixteen chips may be equal to one data symbol. At a higher data rate, for example, 153600 symbols per second, eight chips may be equal to one data symbol. At a higher data rate, for example, 307200 symbols per second, each data symbol may be equal to four chips. Furthermore, at a higher data rate, for example, 614400 symbols per second, each data symbol may be equal to two chips.

When several fingers are assigned to a data symbol of a frame of data, the results from each finger are passed on to a common combiner element as described. If three fingers are assigned to the channel that carries the data symbol, three sets 401-403 of symbols are produced. Each set comprise 16, 8, 4, or 2 chips, depending on whether it belongs to a frame of data which may be at, respectively, according to the examples, 28800, 153600, 307200, or 614400 symbols per second. Each set is passed to a common combiner element, identified by "CEn", where "n" can be any identifier. If the data symbol as represented by a set of chips and the data symbol as represented by another set of chips belong to the same portion of data symbols in the frame of data, all the chips in both sets are passed on to the same combiner element. Otherwise, the combiner elements would be different.

For example, CEn for sets 401-403 may be CE1, for sets 404-405 may be CE2, for sets 406-409 may be CE3, for sets 410-411 may be CE4, and for sets 412-414 may be CE5. The combiner elements CE2 and CE4 may correspond to two portions of data symbols of a common frame of data. The combiner elements CE1 and CE5 may correspond to two portions of data symbols of another common frame of data.

Each data symbol, through its associated chips, is identified to belong to one of the portions of the data symbols. The chip sets pass to corresponding combiner elements based on the identity of the data symbol that they are representing. Therefore, among other reasons, the resources in the receiver 200 are used efficiently by passing data symbols of each portion of data symbols to a common combiner element. The combiner element may also include a memory function where combined data symbols from the fingers are stored. The process of writing in memory, and subsequently reading the data symbols may performed in accordance with a de-interleaving function in the communication system.

According to various embodiments, by partitioning a frame of data into a plurality of portions of data symbols based on the data rate of the frame of data, the channel elements assigned to each portion may demodulate data symbols in the frame of data more efficiently. More specifically, when several data frames from several users are received, and the data rate of the data symbols in at least one received data frame is at a high end of the possible data rates in the communication system, the limited number of channel elements may be used to demodulate all the received frames of data at high and low data rates. For example, frames of data at high data rates require more channel elements than frames of data at low data rates. By pre-fixing a number of channel elements to process high data rate frames of data, fewer channel elements may remain to process data frames with low data rates. By partitioning each frame of data into a plurality of portions of data based on data rate, the data frames with low and high data rates are assured to be processed in most instances. Similarly, when several data frames with similar data rates are received, partitioning each frame of data into a plurality of portions of data based on data rate, the data frames with similar data rates are assured to be processed in most instances.

Generally stated, in accordance with various embodiments, in a communication system, a method and apparatus is provided for efficient use of the communication resources for processing a plurality of frames of data. Each of the plurality of frames of data is partitioned into a plurality of portions of data symbols. A plurality of channel elements is assigned to each of the plurality of frames of data. Each assigned channel element demodulates data symbols of a portion of data symbols. The number of the plurality of channel elements assigned to each frame of data is based on a data rate of the data symbols in each of the plurality of frames of data. Data frames with higher data rates are assigned a higher number of channel elements than the data frames with a lower data rate.

Moreover, the number of the plurality of portions of data symbols in each of the plurality of frames of data is based on a data rate of the data symbols in each of the plurality of frames of data. Similarly, data frames with a higher data rate are partitioned into a higher number of portions than the data frames with a lower data rate. The number of portions of data symbols and the number of channel elements assigned to each frame of data may be equal. It may be necessary to receive information related to the data rate of data symbols of each of the plurality of frames of data to determine the number of assigned channel elements and the number of portions of the data symbols for the partitioning process. Each assigned channel elements demodulates data symbols of a corresponding portion of data symbols.

The plurality of frames of data may be received via a commonly known radio frequency front end. At least a finger is assigned to each frame of data of the plurality of frames of data. At least a data symbol in each of the plurality of frames of data passes through a correlation process in accordance with the timing of one or more fingers assigned to each frame of data of the plurality of frames of data. Assigning multiple fingers to a frame of data may be necessary when several multi-path signals are detected. Each finger may be assigned to a multi-path signal. A result of the correlation is used in the plurality of channel elements for the demodulation process. Demodulated data symbols from the plurality of channel elements are written to, and subsequently read from, a RAM in accordance with a de-interleaving function in the communication system. Accordingly, the available channel elements may be used for all the data frames with different data rates more efficiently.

More specifically, when data rate of the data symbols in a data frame is at a high end of the possible data rates in the communication system, partitioning a frame of data into two or more portions of data symbols allows the assigned channel elements to the portions of data symbols to demodulate the data symbols in the data frame in less time than if the data symbols of the data frame were assigned to one or more channel elements without partitioning the frame of data into portions of data symbols.

The previous description of the preferred embodiments is provided to enable any person skilled in the art to make or use the present invention The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a communication system, an apparatus for processing a frame of data comprising:
   a finger resource for partitioning said frame of data into a plurality of portions of data symbols;
   a plurality of channel elements for demodulating data symbols of said plurality of portions of data symbols, respectively; and
   a RAM for writing, and subsequently reading, demodulated data symbols from said plurality of channel elements in accordance with a de-interleaving function in said communication system,
   wherein the number of said plurality of portions of data symbols is based on a data rate of data symbols of said frame of data.

2. The apparatus as recited in claim 1 wherein the number of said plurality of channel elements is based on a data rate of data symbols of said frame of data.

3. In a communication system, an apparatus for processing a plurality of frames of data comprising:
   a finger resource for partitioning each of said plurality of frames of data into a plurality of portions of data symbols; and
   a plurality of channel elements assigned to each of said plurality of frames of data to demodulate data symbols of said plurality of portions of data symbols of each of said plurality of frames of data, respectively;
   wherein the number of said plurality of channel elements assigned to each frame of data is based on a data rate of the data symbols in each of said plurality of frames of data.

4. The apparatus as recited in claim 3 wherein the number of said plurality of portions of data symbols in each of said plurality of frames of data is based on a data rate of the data symbols in each of said plurality of frames of data.

5. In a communication system, an apparatus for processing a frame of data comprising:
- means for partitioning said frame of data into a plurality of portions of data symbols;
- means for assigning a plurality of channel elements to demodulate data symbols of said plurality of portions of data symbols, respectively;
- means for demodulating said plurality of portions of data symbols by said plurality of assigned channel elements, respectively; and
- means for writing to, and subsequently reading from, demodulated data symbols from said plurality of channel elements, a RAM in accordance with a de-interleaving function in said communication system;
- wherein the number of said plurality of portions of data symbols is based on a data rate of data symbols of said frame of data.

6. The apparatus as recited in claim 5 wherein the number of said plurality of channel elements is based on a data rate of data symbols of said frame of data.

7. In a communication system, an apparatus for processing a plurality of frames of data comprising:
- means for partitioning each of said plurality of frames of data into a plurality of portions of data symbols; and
- means for assigning a plurality of channel elements to each of said plurality of frames of data to demodulate data symbols of said plurality of portions of data symbols of each of said plurality of frames of data, respectively;
- wherein the number of said plurality of channel elements assigned to each frame of data is based on a data rate of the data symbols in each of said plurality of frames of data.

8. The apparatus as recited in claim 7 wherein the number of said plurality of portions of data symbols in each of said plurality of frames of data is based on a data rate of the data symbols in each of said plurality of frames of data.

9. The apparatus as recited in claim 7 further comprising:
- means for receiving information related to a data rate of data symbols of each of said plurality of frames of data.

10. In a communication system, a method for processing a frame of data comprising:
- partitioning said frame of data into a plurality of portions of data symbols;
- assigning a plurality of channel elements to demodulate data symbols of said plurality of portions of data symbols, respectively;
- demodulating said plurality of portions of data symbols by said plurality of assigned channel elements, respectively; and
- writing to, and subsequently reading from, demodulated data symbols from said plurality of channel elements, a RAM in accordance with a de-interleaving function in said communication system;
- wherein the number of said plurality of portions of data symbols is based on a data rate of data symbols of said frame of data.

11. The method of claim 10 wherein the number of said plurality of channel elements is based on a data rate of data symbols of said frame of data.

12. In a communication system, a method for processing a plurality of frames of data comprising:
- partitioning each of said plurality of frames of data into a plurality of portions of data symbols; and
- assigning a plurality of channel elements to each of said plurality of frames of data to demodulate data symbols of said plurality of portions of data symbols of each of said plurality of frames of data, respectively;
- wherein the number of said plurality of channel elements assigned to each frame of data is based on a data rate of the data symbols in each of said plurality of frames of data.

13. The method of claim 12 wherein the number of said plurality of portions of data symbols in each of said plurality of frames of data is based on a data rate of the data symbols in each of said plurality of frames of data.

14. The method of claim 12 further comprising:
- receiving information related to a data rate of data symbols of each of said plurality of frames of data.

* * * * *

UNITED STATES PATENT AND TRADEMARK OFFICE
CERTIFICATE OF CORRECTION

PATENT NO. : 7,590,164 B2 Page 1 of 1
APPLICATION NO. : 09/766558
DATED : September 15, 2009
INVENTOR(S) : Motiwala et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1817 days.

Signed and Sealed this

Twenty-first Day of September, 2010

David J. Kappos
*Director of the United States Patent and Trademark Office*